United States Patent [19]

Seto et al.

[11] Patent Number: 4,682,300
[45] Date of Patent: Jul. 21, 1987

[54] IMAGE CORRECTION PROCESSING METHOD AND APPARATUS

[75] Inventors: Youichi Seto, Hadano; Koichi Homma, Sagamihara; Fuminobu Komura, Yokohama; Shimbu Yamagata, Kawasaki; Yutaka Kubo, Hitachi; Hirotaka Mizuno, Kawasaki, all of Japan

[73] Assignee: Hitachi, Ltd., Tokyo, Japan

[21] Appl. No.: 571,742

[22] Filed: Jan. 18, 1984

[30] Foreign Application Priority Data

Jan. 20, 1983 [JP] Japan .................................. 58-7530

[51] Int. Cl.$^4$ ...................... G01C 25/00; G03B 27/68; H04N 7/18; G06K 9/40
[52] U.S. Cl. .................................... 364/571; 358/109; 355/52; 382/54
[58] Field of Search ..................... 343/5 CM; 358/109; 364/525, 456, 571; 382/42, 54; 355/52; 356/1, 2

[56] References Cited

U.S. PATENT DOCUMENTS

| | | |
|---|---|---|
| 2,839,974 | 6/1958 | Reiner et al. ....................... 355/52 X |
| 3,026,765 | 3/1962 | Guarricini et al. ................ 355/52 X |
| 3,401,595 | 9/1968 | Dinhobel et al. ................. 355/52 X |
| 3,560,642 | 2/1971 | Schroader et al. ................ 358/109 |
| 3,676,581 | 7/1972 | Swet ............................. 358/109 X |
| 3,716,669 | 2/1973 | Watanabe .......................... 358/109 |
| 3,718,756 | 2/1973 | Watanabe .......................... 358/109 |
| 3,952,151 | 4/1976 | Jenkin ........................... 355/52 X |
| 4,313,678 | 2/1982 | Colvocoresses ...................... 356/2 |

Primary Examiner—Errol A. Krass
Assistant Examiner—Joseph L. Dixon
Attorney, Agent, or Firm—Antonelli, Terry & Wands

[57] ABSTRACT

By using a low-frequency component of attitude data of an uncorrected image resulting from scanning the ground by means of a sensor mounted on a satellite, low-frequency distortion correction coefficients are calculated. By using a high-frequency component of attitude data, a change rate is calculated. From said low-frequency distortion correction coefficients and said change rate, distortion correction coefficients covering a high frequency are calculated. By applying bidirectional resampling to the uncorrected image by using said distortion correction coefficients covering a high frequency, a corrected image is obtained.

9 Claims, 15 Drawing Figures

FIG. 9

| | $T_1, T_2$ | $T_3, T_4$ | ADDITIONAL CONDITION | SCAN USED FOR $T_1$ AND $T_2$ | SCAN USED FOR $T_3$ AND $T_4$ |
|---|---|---|---|---|---|
| CASE 1 | F.S. ($S_1$) | F.S. ($S_2$) | $S_1 = S_2$ | $S_1$ | $S_1$ |
| CASE 2 | F.S. ($S_1$) | F.S. ($S_2$) | $S_1 \neq S_2$ | $S_1$ | $S_2$ |
| CASE 3 | F.S. ($S_1$) | R.S. ($S_2$) | — | $S_1$ | $S_1$ |
| CASE 4 | R.S ($S_1$) | F.S ($S_2$) | — | $S_2$ | $S_2$ |
| CASE 5 | R.S. ($S_1$) | R.S. ($S_2$) | $S_1 = S_2$ | $(S_1 - 1)$ | $(S_1 - 1)$ |
| CASE 6 | R.S. ($S_1$) | R.S. ($S_2$) | $S_1 \neq S_2$ | $\dfrac{(S_1 + S_2)}{2}$ | $\dfrac{(S_1 + S_2)}{2}$ |

IMAGE CORRECTION PROCESSING METHOD AND APPARATUS

BACKGROUND OF THE INVENTION

The present invention relates to a correction processing method for a satellite image including geometric distortion, and in particular to a correction processing method for an image, for example, an image fed from a sensor thematic mapper (hereafter referred to as sensor TM) which is an optical sensor mounted on the LANDSAT 4 satellite.

The image obtained from the sensor TM mounted on the LANDSAT 4 satellite includes attitude fluctuation factors of a high frequency (2 to 125 Hz) and may cause hunting during correction processing. Accordingly, a conventional correction processing method for a satellite image can not satisfactorily cope with such an image. The attitude fluctuation factors are caused by the vibration of a large-sized antenna of the satellite. The hunting is caused by the complicated scanning resulting from the reciprocating scanning of the mirror performed by the sensor TM. For the problem of the attitude fluctuation factors, it is conceivable to apply thereto the correction processing for the geometric distortion which has heretofore been used for the attitude fluctuation with a low frequency of 2 Hz or less. However, this method is not desirable since it brings about another problem that an enormous volume of computation is required. The problem of hunting is caused by the unconverging iteration calculation resulting from the absence of the corresponding ground point when a corrected image is to be derived from an observed (uncorrected) image. It is conceivable to obviate this problem by establishing appropriate stopping times for iteration calculation. In this case, however, a considerably large number of stopping times must be set, resulting in a different problem of an increased processing time.

SUMMARY OF THE INVENTION

Therefore, an object of the present invention is to provide an image correction processing method whereby an image from the LANDSAT 4 satellite can also be corrected and processed.

In accordance with the first aspect of the present invention, there is provided a correction processing method for a satellite image including the geometric distortion caused by the attitude fluctuation of a high frequency comprising: a step for calculating a first set of distortion correction coefficients for a low frequency by using a low-frequency component of attitude data; a step for calculating a first deviation quantity on the image by using a high-frequency component of attitude data and a scanning velocity fluctuation data on both the uncorrected space and the hybrid space; a step for calculating a second set of distortion correction coefficients covering a high frequency as well by adding said calculated first deviation quantity to a second deviation quantity which corresponds to said first set of distortion correction coefficients and which is caused by the attitude fluctuation of a low frequency; and a step for eliminating the high frequency distortion on the satellite image by using said calculated second set of distortion correction coefficients. In accordance with the second aspect of the present invention, it is determined whether there is a corresponding ground point between data dropouts (underlaps) occurring in the image obtained by the above described reciprocating scanning and thereby excessive calculation as well as hunting is prevented. As shown in FIG. 14, pixel and line directions of the input (uncorrected) image space respectively correspond to X and Y directions of the output image space. The above described hybrid space refers to a virtual space which has been only subjected to transformation from the pixel direction to the X direction.

BRIEF DESCRIPTION OF THE DRAWINGS

The present invention will be apparent from the following detailed description taken in conjunction with the accompanying drawings, in which:

FIG. 9 shows conditions for selecting scanning;

DESCRIPTION OF THE PREFERRED EMBODIMENT

Figure 1:
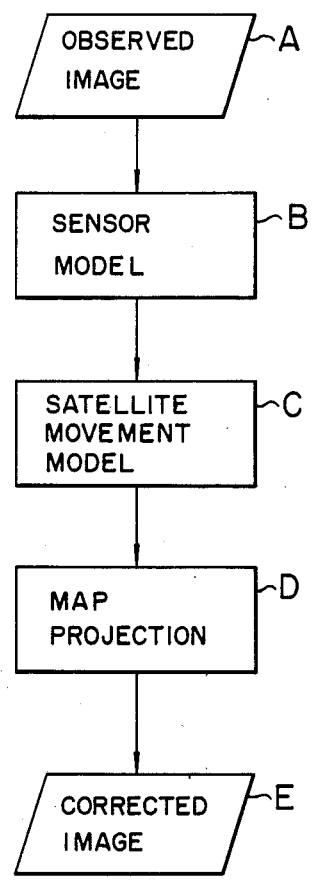
FIG. 1 is a flow chart of correction processing for the geometric distortion of a satellite image.

FIG. 1 is a flow chart of processing for correcting an observed satellite image. The observed image A includes geometric distortion caused by movements such as rotation of the sensor, the satellite and the earth. For the purpose of eliminating the distortion, a correspondence is established between the movement states, such as rotation of the sensor, the satellite and the earth and picture elements on the image by modelling the movements. That is to say, models required for effecting the necessary correction are constituted by correlating the observed image A, including the geometric distortion, to the sample time at the sensor for each picture element and by transforming the states of the orbit and attitude of the satellite into the co-ordinate system around the earth. Modelling is performed by using a sensor model B and a satellite movement model C. In a map projection D, the corrected image E is obtained by a predetermined map projection, such as an SOM (space oblique mercator).

Hereafter, a first embodiment of the present invention corresponding to the above described first aspect of the present invention will be described. Thereafter a second embodiment of the present invention corresponding to the second aspect will be described.

At first, correction processing for an image including geometric distortion caused by attitude fluctuation with a high frequency will be described.

Figure 2:
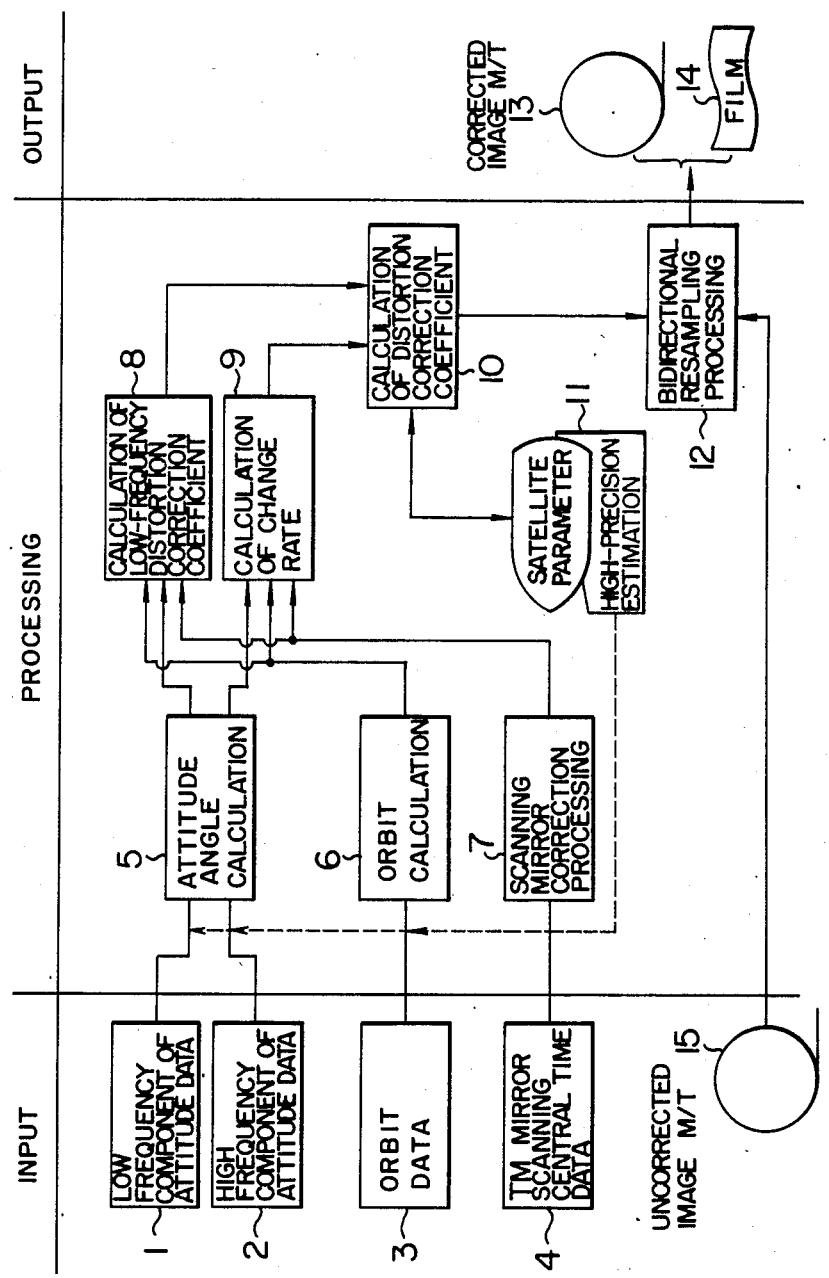
FIG. 2 is a flow chart for illustrating an embodiment of the present invention.

FIG. 2 is a flow chart of the correction processing for geometric distortion included in a satellite image and illustrates an embodiment of the present invention.

The input data are a low frequency component 1 of attitude data, a high frequency component 2 of the attitude data, orbit data 3, TM mirror scanning central time data 4, and an uncorrected image 15. An attitude angle calculation step 5 and an orbit calculation step 6 exert interpolation processing on the input data which represent discrete values. Since the mirror scanning of the sensor TM exhibits a nonlinear dynamic movement, a scanning mirror correction processing step 7 corrects the dynamic fluctuation.

Distortion correction quantitites for a low frequency and a high frequency are derived in a low-frequency distortion correction coefficient calculation step 8 and a change rate calculation step 9, respectively. A distortion correction coefficient covering the high-frequency attitude fluctuation as well is derived in a distortion correction coefficient calculation step 10. At this time, it is also possible to estimate the attitude data and orbit data with a higher precision by carrying out a high precision estimation processing step 11 for satellite parameters and feeding back the result to the attitude angle calculation step 5 and the orbit calculation step 6.

Finally, in a bidirectional (line direction and pixel direction) resampling processing step 12, the uncorrected image 15 is corrected by using the distortion correction coefficients described above and fed to a magnetic tape (M/T) 13 or a film 14.

Figure 3:
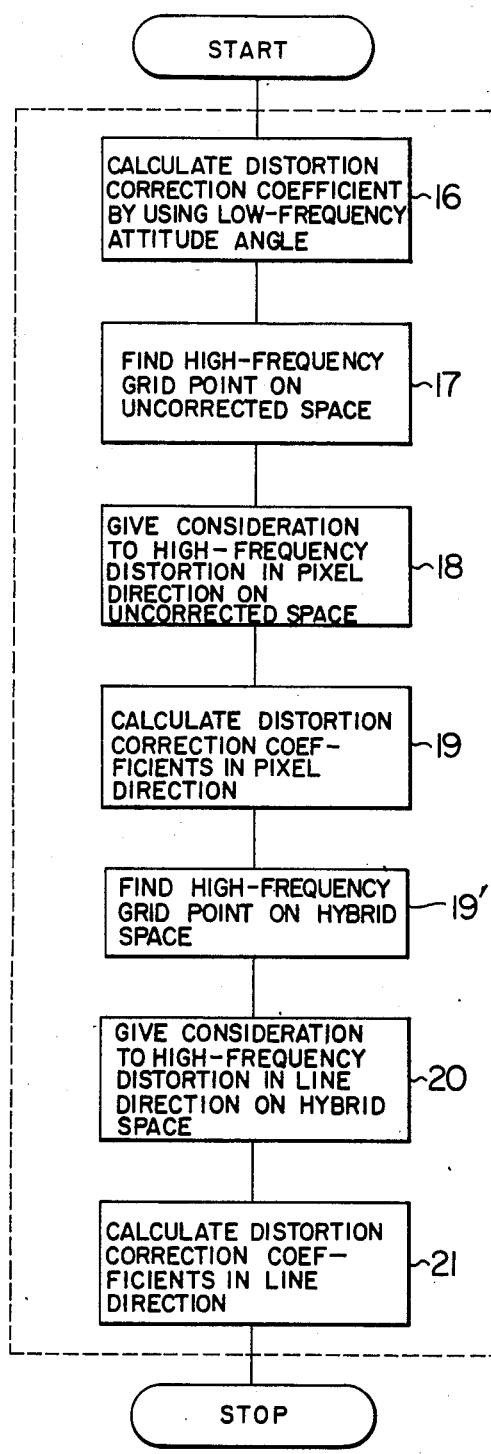
FIG. 3 shows a principal part of the flow chart illustrated in FIG. 2.

FIG. 3 shows details of processing effected in the low-frequency distortion correction coefficient calculation step 8, the change rate calculation step 9, and the distortion correction coefficient calculation step 10. In the processing illustrated in FIG. 3, roughly speaking, the distortion correction coefficients are calculated in consideration of a grid point defined by the distortion correction coefficients which have been calculated by using the low frequency attitude angle and in consideration of the deviation of that grid point caused by the high-frequency attitude fluctuation and the scanning velocity fluctuation.

Details will now be described.

(1) Step 16: Calculate distortion correction coefficients by using the low-frequency attitude angle.

Figure 4:
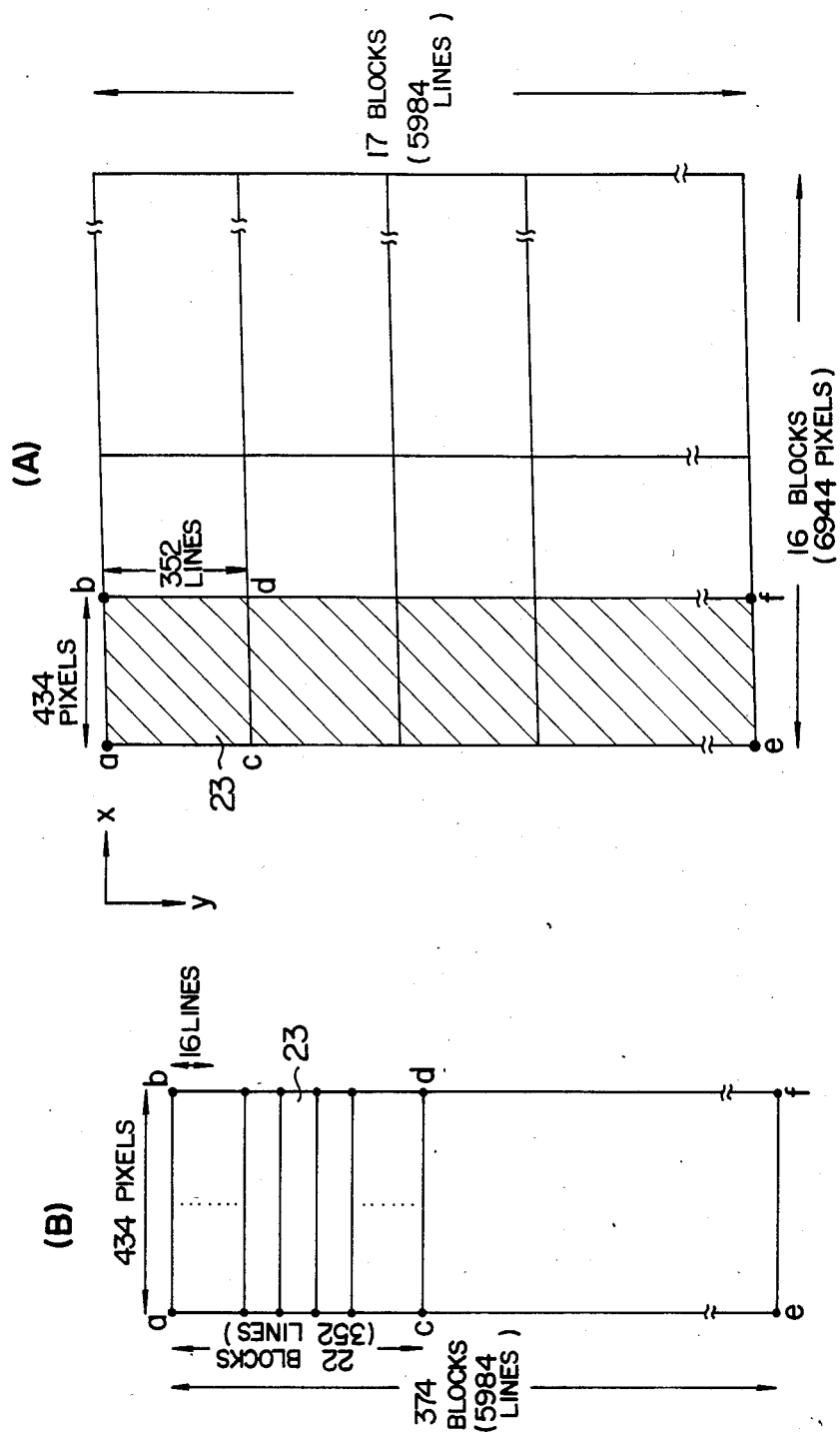
FIG. 4A and FIG. 4B illustrate low-frequency and high-frequency grids, respectively.

As shown in FIG. 4A, a grid point is defined on the output image. In this example, the output image is divided into 16 blocks in the X direction and into 17 blocks in the Y direction. The corresponding position on the input image is found. Thereafter, the low-frequency distortion correction coefficients are derived from the grid point which has been defined.

(2) Step 17: Find the high-frequency grid point on the uncorrected space.

As shown in FIG. 4B, the high-frequency grid on the correction space is obtained by further dividing one block 23 of the low-frequency grid illustrated in FIG. 4A. In this example, a high-frequency grid point is divided into 22 blocks (16 lines/scanning, that is to say, the number of detectors corresponds to one block per one scanning).

Figure 5:
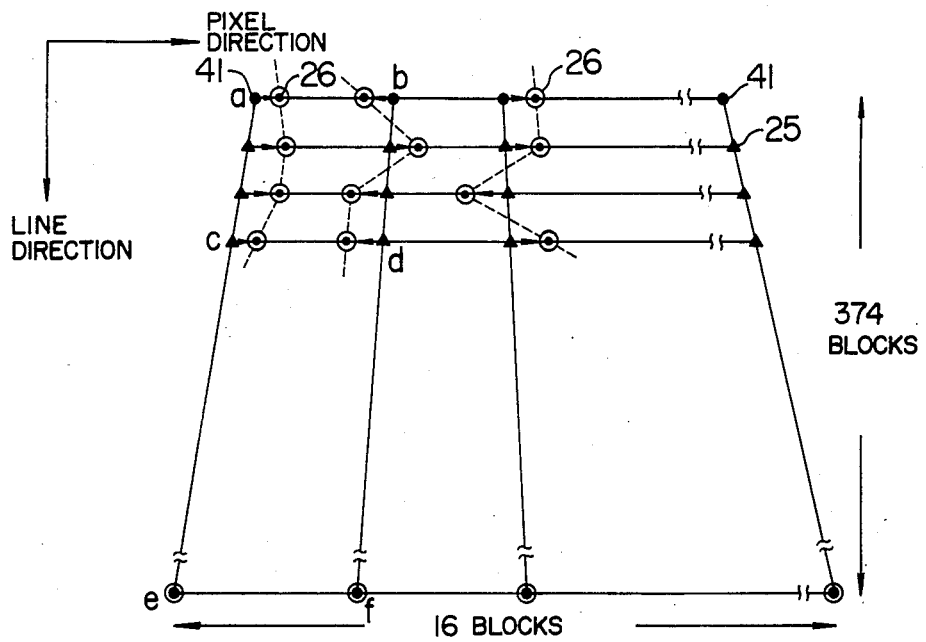
FIG. 5 and FIG. 6 illustrate high frequency distortions in the pixel direction and line direction of the hybrid space.

FIG. 5 shows how the high-frequency distortion in the pixel direction is corrected in the uncorrected space. When a high-frequency grid point in the pixel direction is to be derived, it is necessary to find the high-frequency grid point to be used in step 18 by using the low-frequency distortion correction coefficients found at step 16, by dividing one block 23 (a, b, c, d) of low-frequency grid point shown in FIG. 4A into sixteen lines in the line direction. The uncorrected space is divided into 374 blocks in the line direction. This one block is defined as the number of the above detectors. Each high-frequency grid point 25 which was found from the low-frequency distortion correction coefficient, illustrated by a triangular mark is obtained by applying the cubic convolution interpolation method to four points which are adjacent to the low-frequency grid point 41 in the line direction.

(3) Step 18: Give consideration to high-frequency distortion in the pixel direction on the uncorrected space.

As represented by a grid point 26 indicated by a double circle in FIG. 5, a point representing the deviation caused by the high-frequency attitude fluctuation and so on is found. The formula $$P' = P - \Delta P \qquad (1)$$

is used for this purpose, where P' is a pixel value when the high-frequency attitude fluctuation and so on is taken into consideration. P is a pixel value on the uncorrected space and $\Delta P$ is the deviation in the pixel direction caused by the high-frequency attitude fluctuation and so on.

(4) Step 19: Calculate the distortion correction coefficients in the pixel direction.

The pixel value P' with regard to the high-frequency attitude fluctuation which has been derived using the above formula (1) is represented as regards respective grid points. Then, distortion correction coefficients $P_0$, $P_1$, $P_2$ and $P_3$ are derived by using the formula (2) below.

$$P_i' = P_0 + P_1 X_i' + P_2 Y_i + P_3 X_i' Y_i \qquad (2)$$

$X_i'$ and $Y_i$ are coordinate values on the hybrid space and i (i=1, 2, 3 or 4) represents a grid point.

Step 19': Find the high-frequency grid points (shown as points a, b, c, d in FIG. 6) on the hybrid space by finding corresponding points on the hybrid space to points (a, b, c, d) defined in FIG. 4B, without any consideration for high-frequency attitude fluctuation.

(5) Step 20: Give consideration to the high-frequency distortion in the line direction on the hybrid space.

Figure 6:
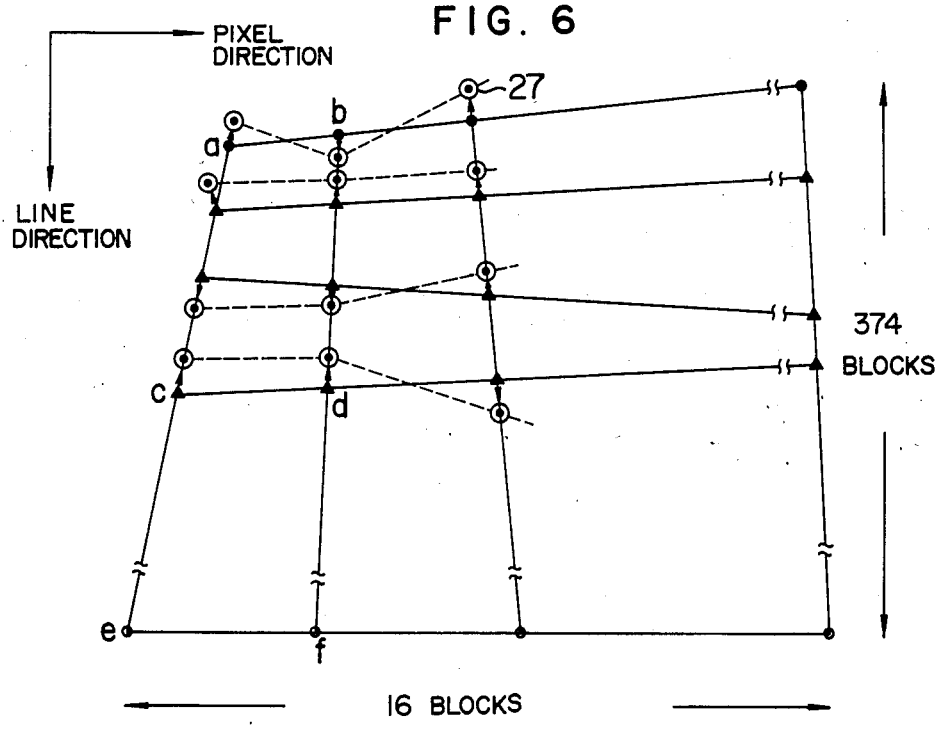

Using the procedure which is similar to that of the step 18, a point 27 representing the deviation caused by the high-frequency attitude fluctuation in the line direction is found as represented by a double circle mark in FIG. 6. The formula $$L' = L + \Delta L \qquad (3)$$

is used for this purpose. L' is a line value when the deviation, such as the high-frequency attitude fluctuation, is taken into consideration. L is a line value on the hybrid space and $\Delta L$ is the deviation in the line direction caused by the high-frequency attitude fluctuation and so on.

(6) Step 21: By using a step similar to the step 19 for calculating the distortion correction coefficients in the line direction, distortion correction coefficients $L_0$, $L_1$, $L_2$ and $L_3$ in the line direction are derived by using the formula $$L'_i = L_0 + L_1 X_i + L_2 Y_i + L_3 X_i Y_i \qquad (4)$$

where $X_i$ and $Y_i$ are coordinate values on the output space, and $i (i=1, 2, 3$ or $4)$ represents a grid point.

By using the above described processing, it is possible to derive distortion correction coefficients $L_0$, $L_1$, $L_2$, $L_3$, $P_0$, $P_1$, $P_2$ and $P_3$ with regard to the high-frequency attitude fluctuation as well. A series of processing as illustrated in FIG. 2 is carried out for each block described above.

How to calculate the high-frequency deviations $\Delta P$ and $\Delta L$ which are used in the above described steps 18 and 20 respectively will now be described.

The high-frequency deviation is caused by:
(a) fluctuation in the scanning velocity (or in time for one scan);
(b) fluctuation in the mirror profile in the scanning direction; and
(c) fluctuation in the high-frequency attitude.

Causes (a) and (b) affect the high-frequency deviation only in the pixel direction.

Accordingly, the high-frequency deviation may be expressed as follows. Forward scan direction:

$$\Delta P = \left\{ Y_P \left( \frac{T_S}{T_N} \right) + JITP + P_F \right\} - OP$$

Reverse scan direction:

$$\Delta P = \left\{ Y_P \left( \frac{T_S}{T_N} \right) + (P_N + 1)\left(1 - \frac{T_S}{T_N}\right) + JITP + P_F \right\} - OP$$

For both forward and reverse scan directions:

$$\Delta L = (Hl + JITL) - OL$$

where
- $Y_P$: Pixel coordinate value of the high-frequency grid points on the uncorrected space,
- $T_S$: Real scanning time per scan,
- $T_N$: Nominal scanning time per scan,
- JITP: High-frequency attitude fluctuation in the pixel direction,
- $P_F$: Mirror profile in the scan direction,
- OP: Pixel coordinate value of the grid point on the hybrid space,
- $P_N$: Nominal number of pixels per scan,
- $H_L$: Line coordinate value of the high-frequency grid point on the hybrid space,
- JITL: High frequency attitude fluctuation in the line direction, and
- OL: Line coordinate value of the grid point on the corrected space.

Figure 7:
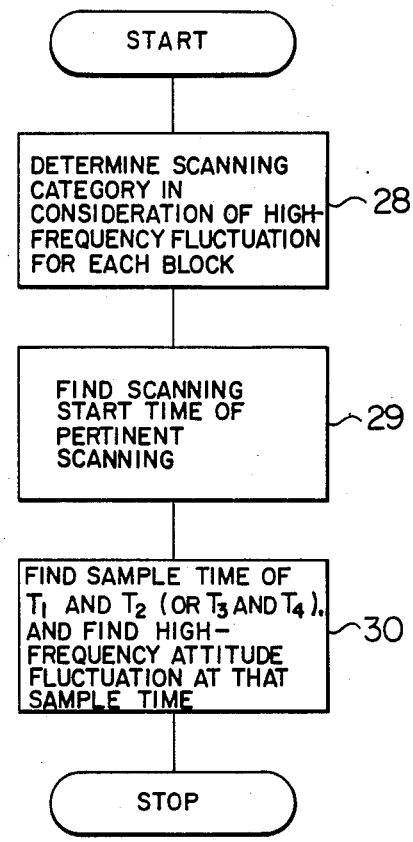
FIG. 7 is a flow chart of the processing for calculating the deviation quantity caused by the high frequency attitude fluctuation.

As for $T_S$ and $P_F$, provided that the pixel coordinate value on the uncorrected space is known, the corresponding sampling time may be distinguished, $P_F$ or $T_S$ of the corresponding scanning line being determined. How to calculate JITP and JITL will now be described in detail by referring to FIG. 7.

(1) Step 28: Determine the scanning category in consideration of the high-frequency fluctuation for each block.

Since the sensor TM effects reciprocating scanning as described above, bidirectional scanning must be considered. The bidirectional scanning means the forward scanning and the reverse scanning.

Figure 8:
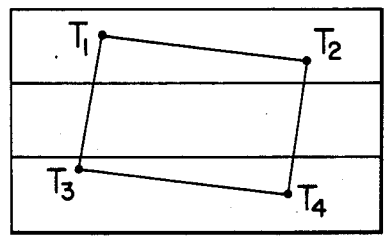
FIG. 8 shows the relationship between grid points and scanning.

FIG. 8 shows grid points $T_1$ to $T_4$ as well as a stage of scanning on the input image. Depending upon the positions of the grid points $T_1$ to $T_4$ in a block, the state of scanning to be adopted is determined. The table of FIG. 9 shows categories used as the basis of such determination. FIG. 9 shows the case for calculating distortion correction coefficients in the forward scan (F.S.) direction. When the distortion correction coefficients in the reverse scan (R.S.) direction are calculated, F.S. and R.S. are interchanged. Where in FIG. 9 grid points $T_1$ and $T_2$ exist in a forward scan and $T_3$ and $T_4$ exist in another forward scan (case 2), the scan in which $T_1$ and $T_2$ exist may be used for $T_1$ and $T_2$ and the scan in which $T_3$ and $T_4$ exist may be used for $T_3$ and $T_4$. Also in case $T_1$ and $T_2$ or $T_3$ and $T_4$ exist in a reverse scanning as shown in cases 3 to 6, the data of the forward scanning are used.

(2) Step 29: Find the scanning start time of the pertinent scanning.

Based on the time data transmitted together with the image from the satellite, the scanning start time is found.

(3) Step 30: Find sample time of $T_1$ and $T_2$ (or $T_3$ and $T_4$), and find the high-frequency attitude fluctuation at that sample time.

This operation is carried out as follows. The roll component refers to the rotation having its axis in the travelling direction of the satellite. The pitch component refers to the rotation having its axis in a horizontal direction which is perpendicular to the travelling direction. The yaw component refers to the rotation having its axis in a vertical direction which is perpendicular to the travelling direction. By representing the roll, pitch and yaw components of the high-frequency attitude fluctuation by JR, JP and JY, respectively, the high-frequency attitude fluctuation JITP in the pixel direction and the high-frequency attitude fluctuation JITL in the line direction may be represented as $$JITL = \frac{\partial L}{\partial R} \cdot JR - \frac{\partial L}{\partial PH} \cdot JPH - \frac{\partial L}{\partial Y} \cdot JY \qquad (5)$$

$$JITP + \frac{\partial P}{\partial R} \cdot JR - \frac{\partial P}{\partial PH} \cdot JPH - \frac{\partial P}{\leftarrow Y} \cdot JY \qquad (6)$$

where $$\frac{\partial L}{\partial R}, \frac{\partial P}{\partial PH} \text{ to } \frac{\partial P}{\partial Y}$$

are the change rates of the picture element position with respect to the attitude angle fluctuation and are calculated as follows.

The scene is partitioned by some grid points. The fluctuation in the line and pixel caused by slight fluctuation of the attitude angle at the grid point is derived. The point on the output space which has been derived by using only the low-frequency attitude angle is represented as $(X_1, Y_1)$ And the point on the output space which has been derived by using the attitude angle for both the low frequency and high frequency is represented as $(X_2, Y_2)$.

Using the expressions $$\Delta P' = (X_2 - X_1)/G_P \quad (7)$$

$$\Delta L' = (Y_2 - Y_1)/G_L \quad (8)$$

$\Delta P'$ and $\Delta L'$ are calculated. By using $\Delta P'$ and $\Delta L'$, the above described change rates are approximated as $$\frac{\partial L}{\partial R} \equiv \frac{\Delta L'}{\Delta R} \quad (9)$$

$$\frac{\partial P}{\partial R} \equiv \frac{\Delta P'}{\Delta R} \quad (10)$$

In expressions (7) and (8), $G_P$ and $G_L$ are the size of the picture element in the pixel direction and that in the line direction, respectively. Therefore, expressions (5) and (6) may be rewritten as $$JITL = \frac{\Delta L'}{\Delta R} \cdot JR - \frac{\Delta L'}{\Delta PH} \cdot JPH - \frac{\Delta L'}{\Delta Y} \cdot JY \quad (11)$$

$$JITP = \frac{\Delta P'}{\Delta R} \cdot JR + \frac{\Delta P'}{\Delta PH} \cdot JPH + \frac{\Delta P'}{\Delta Y} \cdot JY \quad (12)$$

If the line fluctuation component and the pixel fluctuation component at grid points $T_1$ to $T_4$ are represented by linear approximate equations, such as bi-linear equations (13) and (14) given below, including line and pixel positions for each of roll, pitch and yaw components, and coefficients of the linear approximate equation are derived beforehand, it is possible to obtain the line and pixel fluctuation components at an arbitrary point in the scene.

$$\frac{\Delta L'}{\Delta R} = a_0 + a_1 L + a_2 P + a_3 LP \quad (13)$$

$$\frac{\Delta P'}{\Delta R} = b_0 + b_1 L + b_2 P + b_3 LP, \quad (14)$$

where $a_0$ to $a_3$ are bi-linear coefficients in the line direction and $b_0$ to $b_3$ are bi-linear coefficients in the pixel direction. L and P are line and pixel values at an arbitrary point.

In the correction processing for a satellite image including high-frequency geometric distortion according to this embodiment, the attitude data are divided into a high-frequency component and a low-frequency component, and those components are approximated by their individual blocks to yield distortion correction coefficients, resulting in the high correction precision and fast processing.

Figure 10:
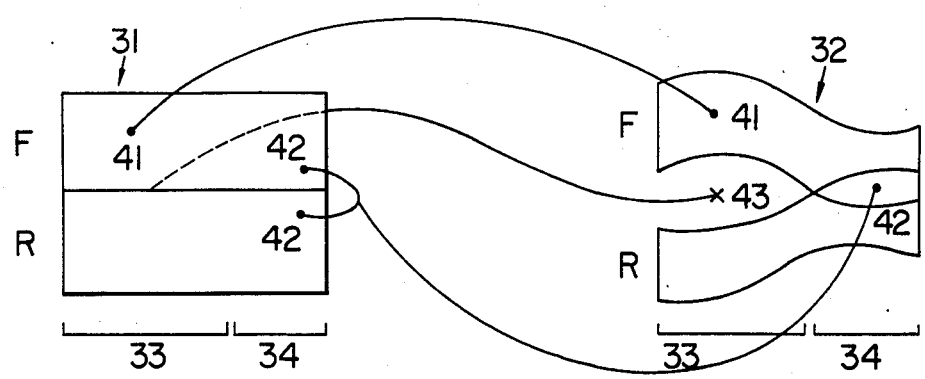
FIG. 10 shows correspondence between an observed image and its corrected image.

The geometric distortion correction processing for an image of the reciprocating scanning type which includes data dropout will now be described. This data dropout presents a problem when finding a point on the input image space corresponding to a grid point on the output image space. FIG. 10 shows the profile of reciprocating scanning performed by a sensor TM mounted on the above described LANDSAT 4 satellite. In FIG. 10, numeral 31 denotes an observed image (input image) and numeral 32 denotes a corrected image (output image). In each image, F and R represent the direction of the above described reciprocating scanning. F denotes the forward scanning and R denotes the reverse scanning.

Due to the aforementioned orbit change and attitude change of the satellite, a data dropout (underlap) state 33 or an overlap scanning state 34 may be caused in the observed image 31. In modeling the movement described before, the corrected image 32 is related with the observed image 31 for each picture element. At this time, an iteration calculation is effected. As for points 41 and 42, they exist on both input and output images, presenting no problem. However, a point 43 which is in the underlap state 33 not does its corresponding point on the output image 32. In conventional iteration calculation, therefore, infinite times of iteration calculation are carried out as described before.

Figure 11:
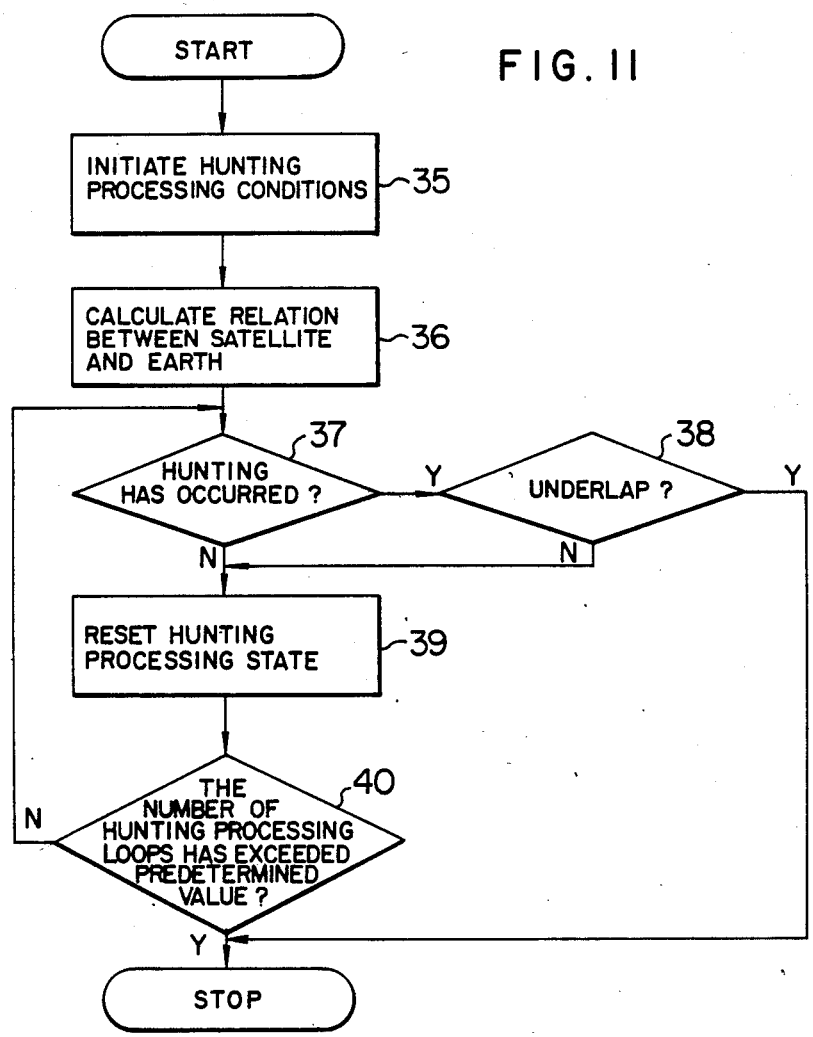
FIG. 11 is a flow chart of hunting processing.
Figure 12:
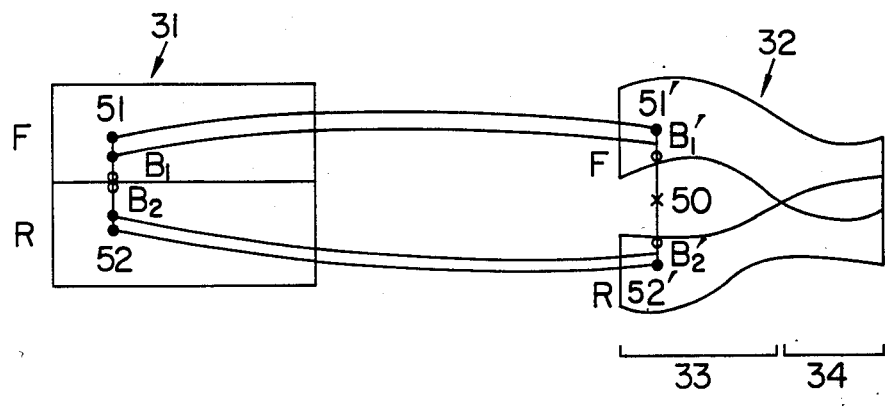
FIG. 12 shows hunting processing performed between an observed image and its corrected image.

In this embodiment, therefore, the hunting processing as illustrated in FIG. 11 is effected. FIG. 12 illustrates the relationship between points on the input image 31 and corresponding points on the output image 32. Referring to FIG. 11 and FIG. 12, the hunting processing will now be described.

(1) Step 35: Initialize the hunting processing conditions.
Flags and bore sight vector positions are initialized.

(2) Step 36: Calculate the relation between the satellite and the earth.

By using a geometric model, the relation between the input image and the output image is derived.

(3) Step 37: Determine hunting.

In FIG. 12, a point 50 on the output image 32 does not have its corresponding point on the input image 31. Assume now that said corresponding point on the input image 31 is a point to be found, i.e., a bore sight vector. At first, a point 51' on the output image 32 is found, which corresponds to an initial point 51 on the input image 31. The distance between the point 51' and the above described point 50 is calculated, and a point 2 which is at that distance from the initial point 51 is found.

If a boundary between two scans exists between the points 51 and 52, underlap determination is effected (at step 28) because of the possibility of occurrence of hunting. Unless the boundary exists between the points 51 and 52, hunting will not occur. In this case, therefore, the hunting processing state is reset (at step 39) to carry out the usual iteration calculation.

(4) Step 38: Underlap determination.

As described before, one scan of the sensor TM in this embodiment consists of 16 lines for either of the forward and reverse scanning. In FIG. 12, points $B_1$ and $B_2$ on the input image 31 are placed at the sixteenth line of the forward scan and the first line of the reverse scan, respectively. If the point 51 is in a scanning state which is different from that of the point 52, it is determined whether or not the above described point 50 is located between points $B_1'$ and $B_2'$ on the output image 32 which correspond to points $B_1$ and $B_2$, respectively. Unless the point 50 is located between points $B_1'$ and $B_2'$, the point 50 is considered not to be in the underlap state. If the point 50 is located between points $B_1'$ and $B_2'$, the point 50 is in the underlap state. In this case, therefore, the iteration calculation is terminated, and a point on the input image 31 corresponding to the point 50 is placed around the center on the boundary between the forward scan and the reverse scan as an approximation (as illustrated by a circle o ).

(5) Step 39: Reset the hunting processing state.

The flag is reset to effect the normal iteration calculation.

(6) Step 40: Count hunting processing loops.

The number of times of iteration calculation is counted. If the counted value exceeds a predetermined value, the iteration calculation is terminated.

Figure 13:
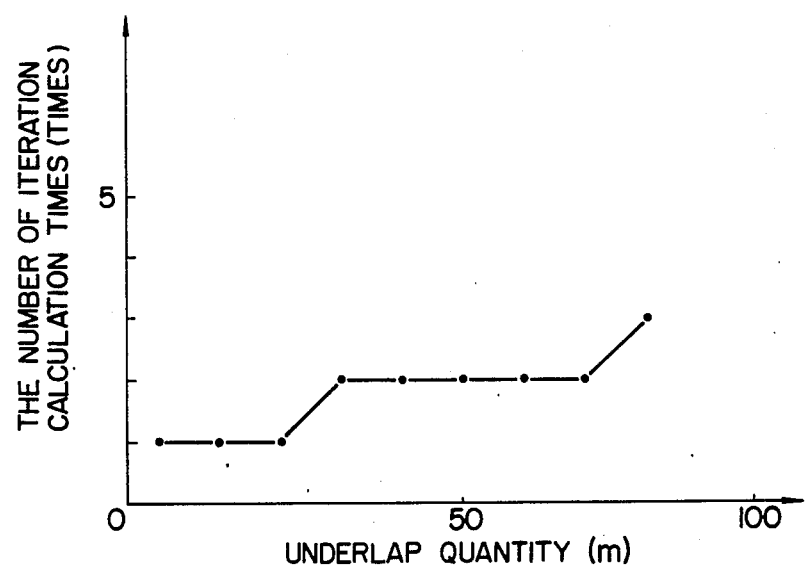
FIG. 13 is a graph illustrating experimental results of the hunting processing.
Figure 14:
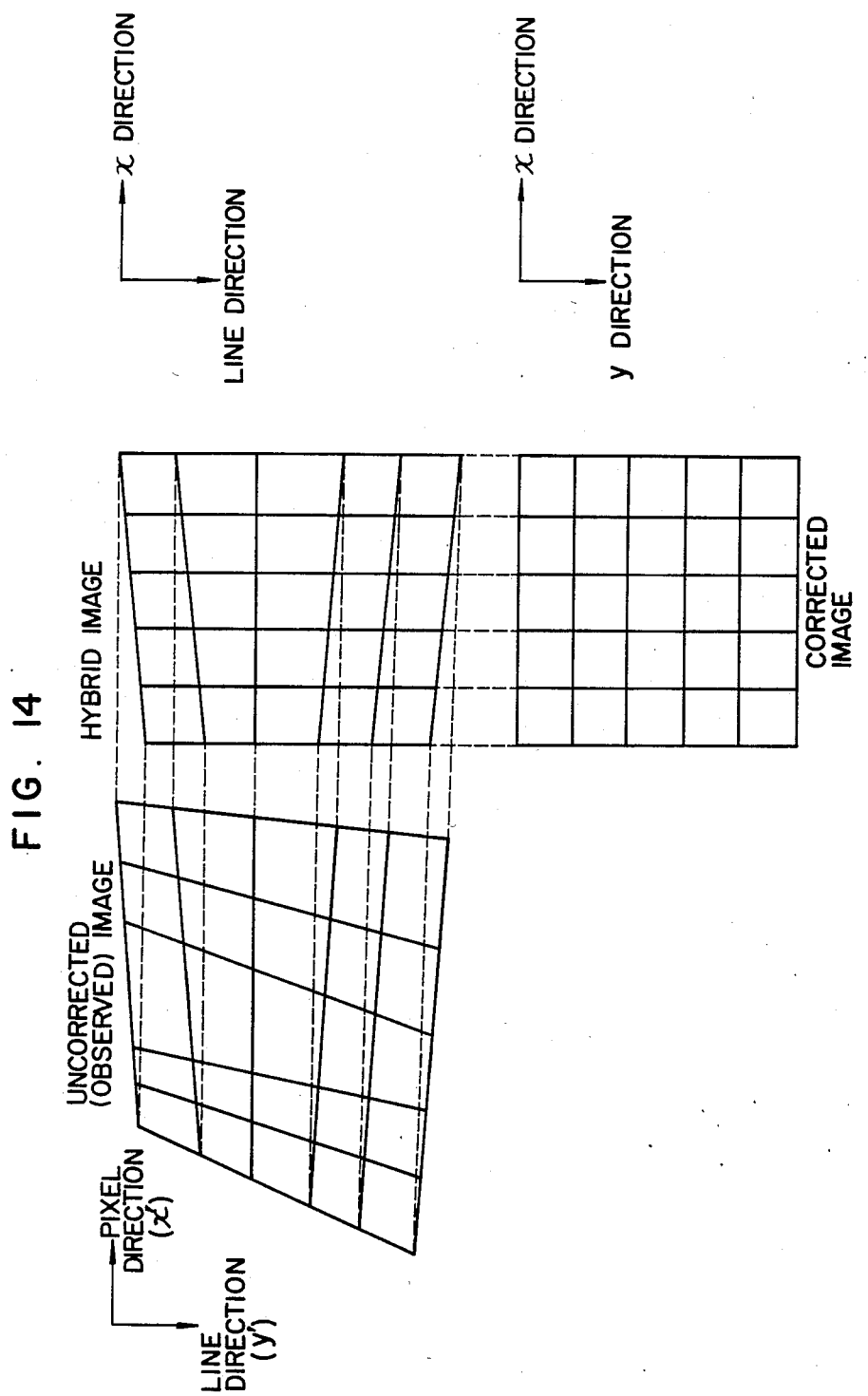
FIG. 14 shows the relationship between the uncorrected space, hybrid space and output space.

FIG. 13 a graph for illustrating the experimental result of the hunting processing. The abscissa represents the underlap quantity and the ordinate represents the number of iteration calculation times. One line of the above described sensor TM of the LANDSAT 4 satellite corresponds to a distance of approximately 30 m on the surface of the earth. The underlap quantity which may occur in the sensor TM image is at most approximately 60 m. Therefore, the method according to this embodiment requires approximately two times of iteration calculation, the processing time being greatly reduced. When hunting has occurred, the bore sight vector is established around the center of the boundary between different scans. Accordingly, the precision is at worst 15 m, resulting in an advantage in practical use.

As heretofore has been described, in accordance with the present invention, it becomes possible to realize an image correction processing method which is able to correct and process an image including high-frequency attitude fluctuation factors or an image having a problem in iteration calculation processing caused by reciprocating scanning.

What is claimed is:

1. A correction processing method for processing a digital image signal representing a satellite image including geometric distortion caused by low and high frequency attitude fluctuation and scanning velocity fluctuation comprising the steps of:
   determining a first set of distortion correction coefficients for a low-frequency component of geometric distortion based on a low-frequency component of attitude data in said image signal;
   determining a first deviation quantity on the satellite image corresponding to the attitude fluctuation based on a high-frequency component of attitude fluctuation data and scanning velocity fluctuation data in said image signal;
   determining a second set of distortion correction coefficients covering a high frequency component of the geometric distortion by adding signals representing said determined first deviation quantity to a second deviation quantity which corresponds to said first set of distortion correction coefficients; and
   correcting the digital image signal representing said satellite image based on said determined second set of distortion correction coefficients.

2. A correction processing method for processing a digital signal representing a satellite image including data dropout caused by reciprocating scanning, comprising:
   effecting an iteration calculation to correlate an uncorrected image signal resulting from ground scanning with a corrected image signal having geometric distortion corrected while taking the picture element as a unit;
   determining whether picture elements correlated with each other in said iteration calculation step are positioned on different scanning lines or not; and
   recognizing the occurrence of said data dropout and terminating succeeding iteration calculation operations provided that said picture elements correlated with each other are positioned on different scanning lines.

3. A method for correcting a satellite image having geometric distortion caused by low and high frequency attitude fluctuation and scanning velocity fluctuation using a system having inputting means, outputting means, processing means and memory means, said method comprising the steps of:
   inputting to said processing means satellite image data stored in said memory means, attitude fluctuation data and scanning velocity fluctuation data by said inputting means;
   determining in said processing means a first set of distortion correction coefficients for a low-frequency component of said geometric distortion based on a low-frequency component of said attitude fluctuation data;
   determining in said processing means a first deviation quantity on said satellite image corresponding to said attitude fluctuation based on a high-frequency component of said attitude fluctuation data and said scanning velocity fluctuation data;
   determining in said processing means a second set of distortion correction coefficients covering a high frequency component of said geometric distortion by adding said first deviation quantity to a second deviation quantity which corresponds to said first set of distortion correction coefficients;
   correcting in said processing means said satellite image data having a geometric distortion based on said determined second set of distortion correction coefficients; and
   outputting from said processing means said corrected satellite image data by said outputting means.

4. A method according to claim 3 in which said step of correcting said satellite image data comprises bi-directional resampling of said satellite image data based on said second set of distortion correction coefficients.

5. A method according to claim 3 in which said memory means is of a type which includes photographic recording film.

6. An apparatus for correcting a satellite image having geometric distortion caused by low and high frequency attitude fluctuation and scanning velocity fluctuation, comprising:
   inputting means for inputting satellite image data, attitude fluctuation data and scanning velocity fluctuation data;
   processing means for determining a first set of distortion correction coefficients for a low-frequency component of said geometric distortion based on low-frequency components of said attitude fluctuation data inputted by said inputting means, for determining a first deviation quantity on said satellite image corresponding to said attitude fluctuation based on a high-frequency component of said attitude fluctuation data and said scanning velocity fluctuation data inputted by said inputting means, for determining a second set of distortion correction coefficients covering a high frequency component of said geometric distortion by adding said first deviation quantity to a second deviation quantity which corresponds to said first set of distortion correction coefficients, and for correcting said satellite image having the geometric distortion by using said calculated second set of distortion corrrection coefficients; and
   memory means for storing said corrected image data.

7. An apparatus according to claim 6, wherein said processing means for correcting said geometric distortion on said satellite image data comprises means for bi-directional resampling of said satellite image data based on said second set of distortion correction coefficients.

8. An apparatus according to claim 6, wherein said memory means includes photographic recording film.

9. A method for correcting a satellite image including data dropout caused by reciprocating scanning, using a system having inputting means, outputting means, processing means and memory means, said method comprising the steps of:

inputting to said processing means satellite image data stored in said memory means, attitude fluctuation data and scanning velocity fluctuation data by said inputting means;

effecting iteration calculation, in said processing means, to correlate an uncorrected image resulting from ground scanning with a corrected image having geometric distortion corrected while taking the picture element as a unit;

determining in said processing means, whether or not picture elements correlated with each other in said iteration calculation step are positioned on different scanning lines;

recognizing, in said processing means, the occurrence of said data dropout and terminating succeeding iteration calculation operations provided that said said picture elements correlated with each other are positioned on different scanning lines; and outputting from said processing means said corrected data excluding said data dropout by said outputting means.

* * * * *